United States Patent
Wolf

(10) Patent No.: US 9,802,658 B2
(45) Date of Patent: Oct. 31, 2017

(54) VEHICLE WITH AN AIR GUIDING ELEMENT FOR CONTROLLING AERODYNAMIC PROPERTIES AND METHOD FOR CONTROLLING AERODYNAMIC PROPERTIES OF A VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/220,579

(22) Filed: Jul. 27, 2016

(65) Prior Publication Data

US 2017/0043817 A1 Feb. 16, 2017

(30) Foreign Application Priority Data

Aug. 10, 2015 (DE) .......................... 10 2015 113 109

(51) Int. Cl.
*B62D 35/02* (2006.01)

(52) U.S. Cl.
CPC .................... *B62D 35/02* (2013.01)

(58) Field of Classification Search
CPC ......... B62D 35/02; B62D 35/00; B62D 37/02
USPC ............................................ 296/180.1, 180.5
See application file for complete search history.

(56) References Cited

U.S. PATENT DOCUMENTS

| 7,661,752 B2 * | 2/2010 | Yamazaki | B62D 25/20 296/180.1 |
| 9,517,802 B1 * | 12/2016 | Froling | B62D 35/02 |
| 2013/0026783 A1 * | 1/2013 | Kakiuchi | B62D 35/02 296/180.1 |
| 2013/0238198 A1 * | 9/2013 | Prentice | B62D 35/02 701/49 |
| 2015/0353149 A1 * | 12/2015 | Wolf | B62D 35/007 296/180.5 |

FOREIGN PATENT DOCUMENTS

| DE | 10 2011 103 787 | 12/2012 |
| DE | 10 2013 101 296 | 8/2014 |

* cited by examiner

*Primary Examiner* — Pinel Romain
(74) *Attorney, Agent, or Firm* — Gerald E. Hespos; Michael J. Porco; Matthew T. Hespos

(57) ABSTRACT

A vehicle has an underbody that rises in a rear region of the vehicle to form a diffuser and an air guiding element for controlling aerodynamic properties of the vehicle. The air guiding element is arranged on the underbody in the rear region of the vehicle. The air guiding element is reversibly transferable between a primary position and a secondary position. In the secondary position, the air guiding element and the underbody arranged behind the air guiding element, as seen in the direction of travel, are arranged forming an angle of more than 75°, preferably of more than 85° and particularly preferably of more than 90° to each other.

9 Claims, 1 Drawing Sheet

VEHICLE WITH AN AIR GUIDING ELEMENT FOR CONTROLLING AERODYNAMIC PROPERTIES AND METHOD FOR CONTROLLING AERODYNAMIC PROPERTIES OF A VEHICLE

CROSS REFERENCE TO RELATED APPLICATION

This application claims priority under 35 USC 119 to German Patent Appl. No. 10 2015 113 109.9 filed on Aug. 10, 2015, the entire disclosure of which is incorporated herein by reference.

BACKGROUND

1. Field of the Invention

The invention relates to a vehicle with an air guiding element for controlling aerodynamic properties of the vehicle and to a method for controlling aerodynamic properties of a vehicle.

2. Description of the Related Art

A rear region of a vehicle may have a rising underbody that forms a diffuser. However, a diffuser can increase resistance, and therefore the vehicle fuel consumption, during travel. To counteract this effect, the prior art includes devices to ensure that the air flow does not follow the rising underbody. Therefore the reaction force that otherwise develops from the flow conditions can be suppressed.

DE 10 2011 103 787 A1 and DE 10 2013 101 296 A1 disclose large underbody components that incline according to the driving situation to ensure a reduction in the air resistance.

It is an object of the invention to provide a space-efficient device that can control the aerodynamic properties of the vehicle depending on the driving situation.

SUMMARY

The invention relates to a vehicle with an air guiding element for controlling aerodynamic properties of the vehicle. The vehicle has an underbody that rises in the rear region to form a diffuser. The air guiding element is arranged on the underbody in the rear region of the vehicle and is reversibly transferable between a primary position and a secondary position. In the secondary position, the air guiding element and the underbody arranged behind the air guiding element, as seen in the direction of travel, are arranged forming an angle of more than 75°, preferably more than 85° and particularly preferably more than 90° to each other. The air guiding element may protrude substantially perpendicularly from the underbody.

The aerodynamic properties of the vehicle can be changed by the reversibly transferable air guiding element depending on the driving situation. The air guiding element that is in the secondary position forms a separation edge that ensures decreased air resistance and increased rear axle lift. However, the air guiding element in the primary position allows the rising underbody to exert an unhindered influence the aerodynamic properties of the vehicle. The rising underbody steers air upward in the primary position of the air guiding element and causes a reaction force that has two force components, namely a force component that is directed down onto a carriageway, and a force component that is directed counter to the direction of travel. Therefore, a down force that is increased in relation to the secondary position can be achieved, but the resistance and hence the energy consumption of the vehicle rise. The air guiding element also advantageously forms a large angle in comparison to the prior art. As a result, an effective separation edge is provided, in which the air guiding element is extensively in the way of the flow without being over dimensioned. Thus, the air guiding element is compact and takes up comparatively little construction space.

The air guiding element that is in the primary position may be aligned to avoid influencing the vehicle aerodynamic properties caused by the rising underbody. For example, the air guiding element that is in the primary position may be arranged at least partially within the vehicle or may bear against the underbody. The air guiding element may extend or pivot relative to the underbody of the vehicle during movement from the primary position to the secondary position.

Direction of travel, as used herein, means the direction of forward travel. A plane that runs through an opening (through which the air guiding element is guided during the transfer between secondary state and primary state) or through a pivot axis (about which the air guiding element is pivoted) and that also runs through the point that is farthest from the opening or the pivot axis in the secondary state is crucial in defining the angle for the air guiding element. The angle may be determined by an outer surface of the air guiding element and the underbody arranged behind the air guiding element. A front surface of the air guiding element facing the flow and a general profile of the underbody behind the air guiding element are used to determine the angle. Furthermore, a person skilled in the art understands a rising underbody to mean a region of the underbody that is inclined and rises toward the rear in the rear region in relation to the main plane of extent that is spanned by the wheel axles and runs parallel to the carriageway. Furthermore, the air guiding element that is in the secondary state protrudes between 10 mm and 50 mm, preferably between 20 mm and 30 mm and particularly preferably 25 mm from the underbody. The vehicle also may comprise a control device that initiates a transfer of the air guiding element from the primary position into the secondary position if, for example, a certain speed is exceeded by the vehicle.

The air guiding element may be pivotable about a pivot axis that runs along a vehicle transverse direction and perpendicular to the direction of travel. The air guiding element may pivot about an angle of more than 75°, preferably more than 85° and particularly preferably of more than 90° for the transfer between the primary and secondary positions. The air guiding element may be able to be latched in place forming different angles of adjustment to bring about different discrete or continuously adjustable aerodynamic conditions in an advantageous manner depending on the driving situation.

The air guiding element may be in a transition region, in which the underbody merges from a region with a non-rising underbody into a region with a rising underbody, or in the region of the rising underbody. For example, the air guiding element may run along an underbody edge that separates a non-rising underbody running substantially parallel to the carriageway from the rising underbody. Alternatively, the air guiding element may be arranged, as seen from the non-rising underbody, in the first half, preferably in the first third and particularly preferably in the first quarter of the rising underbody.

According to a further embodiment of the present invention, it is provided that an extent of the air guiding element along a direction running perpendicularly to the vehicle transverse direction is less than 800 mm, preferably less than 600 mm and particularly preferably less than 400 mm. However, it is substantially provided that the width is configured to be at least the same as the width of the air conducting surface (UBV). As a result, in comparison to the prior art, an air guiding element which is compact in terms of construction space can be provided.

The air guiding element may extend without interruption on the underbody along the vehicle transverse direction. In particular, the air guiding element may be arranged between wheels of the rear wheel axis or the extent thereof substantially corresponds to the distance between the wheels of the rear wheel axis.

The air guiding element may have a rectangular, triangular or cuboidal cross section in a plane running perpendicular to the transverse direction. The air guiding element may be configured so that, in the secondary position, it may have a sharp, i.e. non-rounded edge, on the underside, i.e. on that side of the air guiding element that is directed toward the carriageway.

The invention further relates to a method for controlling aerodynamic properties of a vehicle, wherein the air guiding element is pivoted between the primary position and the secondary position to control the aerodynamic properties.

By means of the method of the invention, the aerodynamic properties of the vehicle can be adjusted depending on the driving situation without being dependent on an air guiding element that is bulky or fills construction space.

Further details, features and advantages of the invention emerge from the drawings and from the description below of preferred embodiments with reference to the drawings. The drawings here merely illustrate illustrative embodiments of the invention and do not restrict the essential inventive concept.

DETAILED DESCRIPTION

In the various figures, identical parts are provided with the same reference signs and are therefore also generally only named or mentioned once in each case.

Figure 1:
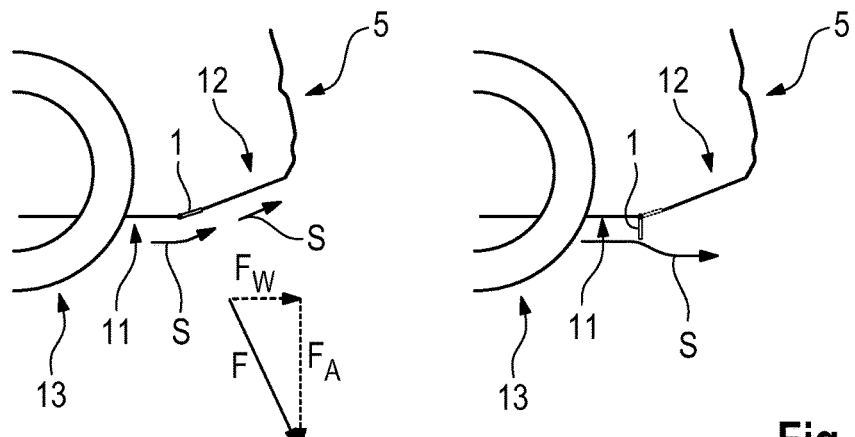
FIG. 1 shows a first embodiment of an air guiding element for a vehicle in a primary position (on the left) and a secondary position (on the right).

FIG. 1 illustrates a vehicle with an air guiding element 1 according to a first embodiment of the invention. The air guiding element 1 is in the rear region 5 of a vehicle and is in a primary position on the left and in a secondary position on the right. An underbody 11, 12 of the vehicle rises in the rear region 5 to form a diffuser. In the primary position, the air guiding element 1 is aligned so that the air guiding element 1 fits into the contour of the underbody 11, 12, i.e. an outer side of the air guiding element 1 follows the general profile of the underbody 11, 12. However, the air guiding element protrudes from the underbody 11, 12 in the secondary position. In the illustrated first embodiment, the outer side of the air guiding element 1 forms part of the rising underbody 12. During forward travel of the vehicle, a flow S is guided away from a carriageway on which the vehicle is moving and follows the rising underbody 12, if the air guiding element 1 is in the primary position. Thus, a reaction force F is generated and has a first force component FA directed onto the carriageway and a second force component FW running in an opposed manner to the direction of travel. The first force component FA is a downward force acting on a rear wheel axle 13 of the vehicle and has a positive effect on the driving dynamics of the vehicle. However, the second force component FW is opposed to the direction of travel becomes noticeable as a resistance at the same time and thus influences, for example, the vehicle fuel consumption. Aerodynamic properties of the vehicle can be controlled or manipulated by the air guiding element 1 so that a lift of the rear wheel axle 13 increases and an air resistance drops. For this purpose, the air guiding element 1 is transferred into the secondary position in which the air guiding element 1 extends substantially vertically and substantially perpendicularly to the general profile of the underbody. In order to change between the primary position and the secondary position depending on the driving situation, the air guiding element 1 is coupled to the underbody 11, 12 so as to be pivotable about a pivot axis S that runs along a transverse direction and perpendicularly to the direction of travel. In particular, in the secondary position, the air guiding element 1 forms a separation edge that suppresses a formation of force, such as the force caused in the primary position by the rising underbody. Thus, the air guiding element 1 ensures that the air flows further in a substantially horizontally behind the air guiding element 1 with respect to the direction of travel. For the transfer into the secondary position from the primary position, the air guiding element 1 is pivoted by more than 75°, preferably by more than 80° and particularly preferably by more than 90° about the pivot axis S running parallel to the transverse direction of the vehicle. This comparatively large adjustment angle enables the air guiding element 1 to be used in the secondary position comparatively extensively as seen in the direction of travel, as a separation edge. An extent of the air guiding element along a direction running perpendicularly to the pivot axis S is preferably less than 800 mm, preferably less than 600 and particularly preferably less than 400 mm. This makes it possible in an advantageous manner to dispense with air guiding elements that fill the construction space and that would otherwise extensively extend along the underbody 11, 12 of the vehicle in the rear region 5.

Figure 2:
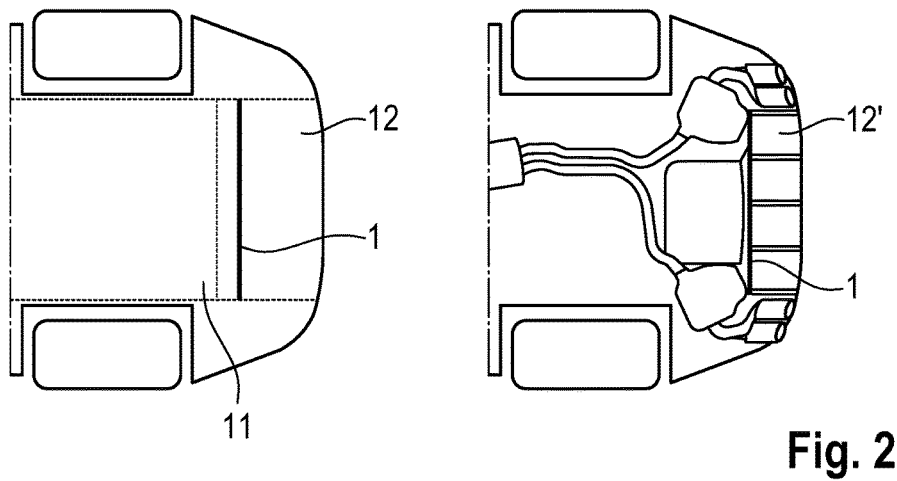
FIG. 2 shows various arrangements of the air guiding element on different vehicles according to the invention.

FIG. 2 illustrates various arrangements of the air guiding element 1 of the first embodiment of the invention on different vehicles. The air guiding element 1 extends, for example uninterrupted over an entire transverse length of the underbody. More particularly, the air guiding element 1 is arranged in a transition region in which the underbody merges from a flat profile substantially parallel to the carriageway, i.e. from the region of the non-rising underbody 11, into the region of the rising underbody profile to form the diffuser. It is conceivable for the pivot axis of the air guiding element to form an edge. The embodiment is illustrated on the left side of FIG. 2 has the air guiding element 1 arranged in the first third of the rising underbody 12, as viewed counter to the direction of travel. The underbody 11, 12 may be lined fully, but the embodiment illustrated on the right side has an underbody 11, 12 that is not fully lined, such as is the case of an off-road vehicle. In particular, a rear lining 12' or rear apron is provided to form the rising underbody 12 and therefore the diffuser. The air guiding element 1 is in the region of the front edge of the rear apron, in particular in the region of a curvature or of the rising rear undersurface.

Figure 3:
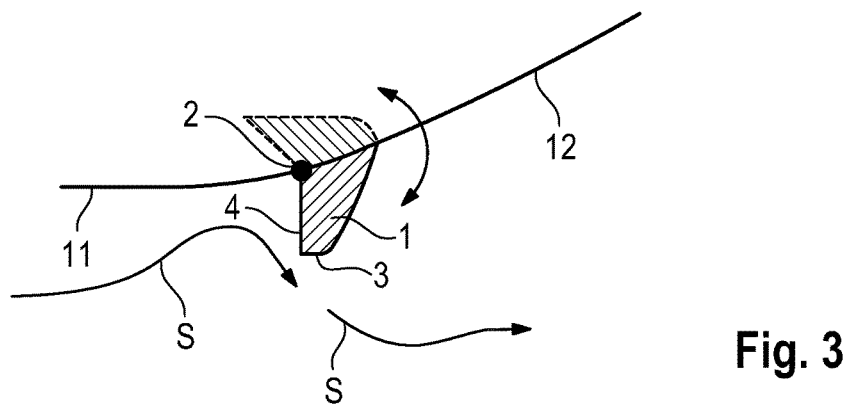
FIG. 3 shows a vehicle according to a second embodiment of the invention.

FIG. 3 illustrates an air guiding element 1 according to a second embodiment of the invention. The air guiding element 1 forms a volume that is pivotable about the pivot axis 1 or a pivotable displacement body which, in the secondary position, has a substantially vertically running outer side or front surface 4, on the lower end of which (in the secondary position) an edge 3 runs. The side opposite the front surface on the air guiding element may be oblique. In the secondary position, the air guiding element is capable of preventing the flow downstream from being applied again to the underbody.

LIST OF REFERENCE SIGNS

1 Air guiding element
2 Pivot axis
3 Edge
4 Frontal surface
5 Rear region
11 Non-rising underbody
12 Rising underbody
12' Rear lining
13 Rear wheel axle
S Flow
F Reaction force
$F_A$ First force component
$F_W$ Second force component

What is claimed is:

1. A vehicle comprising: an underbody with a non-rising region having a rear end and a rising region with a front end at the rear end of the non-rising region, the rising region of the underbody rising up from the non-rising region toward a rear end of the vehicle to form a diffuser; and an air guiding element arranged at the underbody of the vehicle for controlling aerodynamic properties of the vehicle, the air guiding element having opposite first and second ends, the first end being substantially aligned with or rearward of the front end of the rising region of the underbody, the air guiding element being reversibly transferable between a primary position and a secondary position, in the secondary position, the second end of the air guiding element projecting below the underbody and, in the secondary position, the air guiding element and areas of the underbody arranged behind the air guiding element, as seen in a forward direction of travel, form an angle of more than 75° to each other.

2. The vehicle of claim 1, wherein the air guiding element is pivotable about a pivot axis that runs along a vehicle transverse direction running perpendicular to the direction of travel for transfer between the primary position and the secondary position.

3. The vehicle of claim 1, wherein a projecting distance of the air guiding element from the underbody is in a range of 10 mm and 50 mm.

4. The vehicle of claim 2, wherein an extent of the air guiding element along a direction running perpendicular to the vehicle transverse direction is less than 800 mm.

5. The vehicle of claim 2, wherein the air guiding element extends on the underbody along the vehicle transverse direction.

6. The vehicle of claim 2, wherein the air guiding element has a rectangular, triangular or cuboidal cross section in a plane running perpendicular to the transverse direction, the air guiding element having a front surface aligned substantially vertically when the air guiding element is in the secondary position, the air guiding element further having a rear surface extending from the second end of the air guiding element obliquely rearward and up to the rising region of the underbody.

7. A method for controlling aerodynamic properties of a vehicle that has an underbody with a non-rising region having a rear end and a rising region with a front end at the rear end of the non-rising region, the rising region of the underbody rising up from the non-rising region toward a rear end of the vehicle to form a diffuser; and an air guiding element arranged at the underbody of the vehicle for controlling aerodynamic properties of the vehicle, the air guiding element having opposite first and second ends, the first end being substantially aligned with or rearward of the front end of the rising region of the underbody, wherein the method to control the aerodynamic properties comprises:

sensing a speed of the vehicle;

keeping the air guiding element in a primary position where the air guiding element is substantially flush with the underbody when the sensed speed of the vehicle is at or below a specified level; and pivoting the air guiding element to a secondary position when the sensed speed is above the specified level, a free end of the air guiding element projecting below the underbody when the air guiding element is in the secondary position, the air guiding element and areas of the underbody arranged behind the air guiding element, as seen in a forward direction of travel, forming an angle of more than 75° to each other, when the air guiding element is in the secondary position.

8. The vehicle of claim 1, wherein the that the vehicle has a rear wheel, the rising region of the underbody and in the air guiding element being disposed entirely rearward of the rear wheel.

9. The vehicle of claim 1, wherein at least a front surface of the air guiding element and areas of the underbody arranged behind the air guiding element, as seen in a forward direction of travel, form an angle of more than 90° to each other when the air guiding element is in the secondary position.

* * * * *